United States Patent [19]
Khanmamedov

[11] Patent Number: 5,965,100
[45] Date of Patent: Oct. 12, 1999

[54] PROCESS FOR RECOVERY OF SULFUR FROM AN ACID GAS STREAM

[76] Inventor: Tofik K. Khanmamedov, 2934 Beltline Rd., Garland, Tex. 75044

[21] Appl. No.: 08/709,107

[22] Filed: Sep. 6, 1996

Related U.S. Application Data

[63] Continuation-in-part of application No. 08/428,031, Apr. 25, 1995, abandoned.

[51] Int. Cl.$^6$ ..................................................... C01B 17/20
[52] U.S. Cl. .................... 423/576.8; 423/574; 423/576.1
[58] Field of Search ................................. 423/574.1, 576, 423/576.8

[56] References Cited

U.S. PATENT DOCUMENTS

| | | |
|---|---|---|
| 2,919,976 | 1/1960 | Feagen, Jr. . |
| 4,147,763 | 4/1979 | McKinzie et al. . |
| 4,818,740 | 4/1989 | Berben et al. . |
| 4,886,649 | 12/1989 | Ismagilov et al. . |
| 4,937,058 | 6/1990 | Dupin et al. . |
| 4,988,494 | 1/1991 | Lagas et al. . |
| 5,028,409 | 7/1991 | Gitman . |
| 5,294,428 | 3/1994 | Watson . |
| 5,352,422 | 10/1994 | Van den Brink et al. . |

FOREIGN PATENT DOCUMENTS

| | | |
|---|---|---|
| 749277 | 12/1966 | Canada . |
| 239262 | 12/1969 | U.S.S.R. . |
| 856974 | 8/1981 | U.S.S.R. . |

OTHER PUBLICATIONS

Khanmamedov, Kalinkin, Kundo, and Novopashina; "XPS Studies Of Active Surface of Al–Cu–Cr Catalysts For Oxidation Of Tail Gases From Sulfur Production"; *React. Kinet. Catal. Lett.*, vol. 37, No. 11, pp. 83–88; 1988; Budapest, Hungary.

Khanmamedov, Gulmaliev, Sharipov, and Ledyaev; "Catalytic Incineration of Tail Gases of Claus Sulfur Plants"; *Gasovaya Promyshlennost*, No. 3, p. 38; 1886; Moscow, USSR.

Khanmamedov, Sharipov, Gulmaliev, and Chemezov; "Semi–Commercial Test of the Catalytic Incineration of Tail Gases of Clause Plants"; *Gasovaya Promyshlennost*, No. 12, pp. 42–43; 1886; Moscow, USSR.

*Primary Examiner*—Gary P. Starub
*Attorney, Agent, or Firm*—H. Dennis Kelly; Jeffrey T. Hubbard; Timmons & Kelly

[57] ABSTRACT

A gas stream containing hydrogen sulfide is combusted in a furnace to form a gas having a hydrogen sulfide to sulfur dioxide ratio of at least three to one. The gas is contacted with a conventional Claus catalyst to form elemental sulfur, which is separated and removed. The remaining gas is combined with an oxidizing gas stream and contacted with a special catalyst. The special catalyst has an active ingredient comprising a mixture of metal oxides or a mixed metal oxide, where metal is defined as at least two of the transition metals occurring in the first transition group of the periodic table. The special catalyst preferably has a spinel structure. As an option, a portion of the acid gas feed can be bypassed a point before the final reactor to ensure that the gas going to the final reactor promotes the desired catalytic action. The special catalyst oxidizes both COS and $CS_2$ to $CO_2$ and $SO_2$, and converts $H_2S$ and $SO_2$ to elemental sulfur and water. The process converts a greater percentage of hydrogen sulfide to elemental sulfur than the Claus process, and also gives greater overall sulfur recovery.

24 Claims, 5 Drawing Sheets

PROCESS FOR RECOVERY OF SULFUR FROM AN ACID GAS STREAM

BACKGROUND OF THE INVENTION

This application is a continuation-in-part of U.S. Ser. No. 08/428,031, filed Apr. 25, 1995, now abandoned.

TECHNICAL FIELD

This invention relates to a process for recovering sulfur from an acid gas stream, and in particular to a modified Claus process employing sub-stoichiometric oxidation of the hydrogen sulfide and a special catalyst. The special catalyst uses sulfates formed during catalysis and promotes reactions that convert a wider range of sulfurous compounds to elemental sulfur, with greater overall efficiency than the conventional Claus process.

DESCRIPTION OF THE RELATED ART

Methods for the recovery of sulfur from a gas stream are generally known. Increasingly stringent environmental regulations have created demand for processes that convert more of the sulfurous compounds in the gas stream to sulfur, especially hydrogen sulfide and sulfur dioxide.

One of the best known methods for treating hydrogen sulfide containing gas is the Claus process. In this process, hydrogen sulfide is partially oxidized by combustion with free oxygen in a furnace, where the following reactions take place:

$$2H_2S + 3O_2 \rightarrow 2SO_2 + 2H_2O \qquad (1)$$

$$2H_2S + SO_2 \leftrightarrows 3/nS_n + 2H_2O \qquad (2)$$

Maximum conversion occurs when one third of the $H_2S$ in the feed is oxidized according to equation (1). The reaction of equation (2) is limited by equilibrium. As a result only about two thirds of the total mass of hydrogen sulfide in the feed acid gas is converted to elemental sulfur in the furnace. The elemental sulfur is separated from the gas stream by condensation, and the remaining gas is processed further by contacting it with a series of catalytic beds, where each bed is followed by a condenser that separates the sulfur from the gas stream. Reaction (2) takes place in each catalytic bed, again being limited by equilibrium. In addition, some COS and $CS_2$ that was formed in the furnace converts to H2S and CO2 by $$COS + H_2O \rightarrow CO_2 + H_2S \qquad 3)$$

$$CS2 + 2H2O \rightarrow CO2 + 2H2S \qquad 4)$$

Three catalyst stages are generally considered optimum. However, the $H_2S$ level in the remaining gas can still exceed recent regulatory limits, and burning the gas in a flare or incinerator produces $SO_2$ in levels that can also exceed regulatory limits.

Methods for removing and converting the residual $H_2S$ and $SO_2$ to elemental sulfur are complex and expensive, mainly due to the need to remove $SO_2$ from the gas or to convert it to $H_2S$. This is necessary because $SO_2$ interferes with absorbents that are selective for $H_2S$. One method for converting the $SO_2$ and removing $H_2S$ is the SCOT process, wherein the acid gas is reduced with hydrogen using a catalyst containing cobalt and molybdenum oxides on an aluminum oxide carrier, thereby converting the $SO_2$ to $H_2S$. The $H_2S$ is then removed and concentrated by a conventional liquid/gas absorption/regeneration process. The process is energy intensive, and the capital expenditure can be as great as that of the Claus process unit.

The conventional Claus process has several drawbacks. For one, the process is only capable of converting and recovering about 95 percent of the $H_2S$ in the feed gas as elemental sulfur when using three catalytic beds. Studying equation (2) reveals that water vapor present in the acid gas promotes the reverse Claus reaction, thus limiting sulfur recovery. Processes designed to remove water in order to improve sulfur yield are generally costly and difficult to implement. A more serious drawback is that activated alumina, the usual Claus catalyst, is quite sensitive to feed gas composition. Sulfur dioxide combines with any free oxygen to form stable sulfates on the catalyst. The sulfates deactivate the catalyst. The catalyst can be partially regenerated by treating the bed with $H_2S$ at elevated temperatures, releasing $SO_2$ as a byproduct. Despite regeneration, the catalyst remains substantially less active than fresh catalyst.

Substoichiometric combustion of the $H_2S$ in the thermal reaction stage has been used in an attempt to improve the Claus process. Examples of such methods are disclosed in U.S. Pat. No. 2,919,976, issued to Feagan, Jr., and U.S. Pat. No. 5,028,409, issued to Gitman. In the Feagan, Jr. reference, the additional free oxygen required to achieve stoichiometric oxidation of the hydrogen sulfide is added at the inlets of the catalytic beds, in order to maintain the desired temperature in the reactors. In the Gitman process, additional free oxygen is added at several points downstream of the thermal reactor, in order to promote greater sulfur recovery. Sulfate formation in the downstream catalytic beds is still a problem in these methods if unconsumed oxygen is present.

U.S. Pat. No. 4,818,740, issued to Berben et al., discloses the structure of a catalyst designed to oxidize hydrogen sulfide directly to elemental sulfur according to the equation $$H_2S + \tfrac{1}{2}O_2 \rightarrow 1/nS_n + H_2O \qquad (5)$$

The catalyst is claimed to be substantially unaffected by water vapor, so that the reverse Claus reaction of equation (2) does not occur. The catalyst has stringent requirements for physical characteristics in order to prevent promotion of the reverse Claus reaction of equation (2).

U.S. Pat. No. 5,352,422, issued to van den Brink et al., discloses an improvement to the catalyst described in the Berben et al. patent. Different carriers are used to prevent the undesired reverse Claus reaction, and the catalyst has greater specific surface area than the catalyst in the Berben et al. patent. Iron and chromium oxides are used as active agents to promote reaction (5).

U.S. Pat. No. 4,988,494, issued to Lagas et al., discloses a modified Claus process. The Claus section operates under substoichiometric conditions, and the $H_2S$ concentration leaving the final Claus catalytic bed ranges from 0.8 to 5 volume percent. The Claus section is followed by a catalytic bed filled with a variation of the Berben catalyst. This additional stage is claimed to improve overall hydrogen sulfide conversion to above 98 percent. The process does not convert COS or $CS_2$.

Catalysts using an active component with spinel structure have been used for removing $SO_2$ from a gas stream. Spinel is a mixed oxide having the general formula $AB_2O_4$, where A comprises at least one bivalent metal and B comprises at least one trivalent metal. U.S. Pat. No. 4,147,058, issued to McKinzie et al., discloses a method using such a catalyst, for reducing $SO_2$ in power plant stack gases according to the following reactions:

$$SO_2 + 2CO \rightarrow S + 2CO_2 \tag{6}$$

$$SO_2 + 2H_2 \rightarrow S + 2H_2O \tag{7}$$

The stack gas is reduced using free hydrogen or carbon monoxide at temperatures between 450° C. and 700° C.

Spinel has advantages when used as an active agent. When the proper metals are used, the spinel reacts to form sulfates that are unstable enough to react with $H_2S$ and other compounds to form elemental sulfur. In addition, spinel catalysts can convert COS and $CS_2$ to $SO_2$, which is then converted to elemental sulfur via the Claus reaction (2), increasing overall sulfur recovery. The paper written by T. K. Khanmamedov et al., entitled "XPS STUDIES OF ACTIVE SURFACE OF Al—Cu—Cr CATALYSTS FOR OXIDATION OF TAIL GASES FROM SULFUR PRODUCTION" and published in React. Kinet. Catal. Lett., Vol. 37, No. 1, 1988, pages 83–88, discusses spinel catalyst and sulfate reactions, and is included herein by reference.

However, spinel has not been popular for use as an alternative to the conventional Claus catalyst. U.S. Pat. No. 4,937,058, issued to Dupin et al., discloses a method of removing $H_2S$, $SO_2$, COS, and $CS_2$ from a stream using a special catalyst. The patent discloses the use of oxides of metals commonly found in spinel, but the patent specifically states that the catalyst is devoid of mixed oxide of the spinel type.

A need remained for a process having greater hydrogen sulfide conversion and overall sulfur recovery than the conventional Claus process. Such a process should not entail significantly greater expense, equipment or complexity than the conventional Claus process. A process that does not require energy intensive mechanism such as distillation and fractionation was also desired. Finally, a process that can also reduce COS $CS_2$ to form elemental sulfur was also desired.

SUMMARY OF THE INVENTION

An object of the invention is to recover more sulfur from an acid gas stream than is accomplished with the conventional Claus process. Another object of the invention is that the process be roughly equivalent in cost, equipment, and complexity to the conventional Claus process. A third object is that the process be able to recover sulfur from COS and $CS_2$ as well as $H_2S$ and $SO_2$. A further object is that the overall process not suffer detrimental effects from free oxygen or water vapor in the acid gas stream.

In general, these objects are achieved by a modified Claus process. In the preferred embodiment of the invention, the gas is first treated in a Claus section using less oxygen than that required to oxidize one third of the hydrogen sulfide. The amount of free oxygen admitted to the thermal reactor is controlled to produce a reactor effluent having a mole ratio of $H_2S$ to $SO_2$ of at least 3:1. Thus, only trace amounts of free oxygen should be present in the reactor effluent, and a conventional Claus catalyst can be used in the first catalyst zone without significant risk of sulfate formation. The gas is then treated in one or more catalytic beds employing a special catalyst.

The special catalyst comprises an oxide of at least two metals in the first transition group of the periodic table, i.e. elements from scandium (at. no. 21) to zinc (at. no. 30) inclusive. At least a portion of the active material is preferably characterized by a spinel structure. The special catalyst converts $H_2S$, $SO_2$, COS and $CS_2$ to elemental sulfur by the following reactions:

$$2H_2S + 3O_2 \rightarrow 2SO_2 + 2H_2O \tag{8}$$

$$2SO_2 + 2MeO + O_2 \rightarrow 2MeSO_4 \tag{9}$$

$$7H_2S + 2MeSO_4 \rightarrow 9/nS_n + Me_2O + 7H_2O \tag{10}$$

where Me represents a metal. For practical purposes, reactions (8), (9), and (10) are not limited by equilibrium.

The special catalyst has two major advantages over the prior art. Sulfate formation is an undesired side reaction of conventional Claus catalysts. For the special catalyst of the present invention, sulfates formed during catalysis react further to form elemental sulfur. Thus, sulfates do not inhibit catalyst performance and the acid gas stream can be oxidized with excess air without significant catalyst deactivation. The second advantage of is that the special catalyst can convert COS and $CS_2$ into $CO_2$ and $SO_2$, which converts to elemental sulfur. This improves overall sulfur recovery compared to the conventional Claus process and the direct oxidation processes, which do not convert either COS or $CS_2$. The process can be adapted to handle a wide range of feed stock hydrogen sulfide compositions in the same manner as the conventional Claus process, and the equipment and space requirements are essentially equivalent.

The above, as well as additional objects, features, and advantages of the invention will become apparent in the following detailed description and in the drawings.

DESCRIPTION OF THE PREFERRED EMBODIMENT

Figure 1:
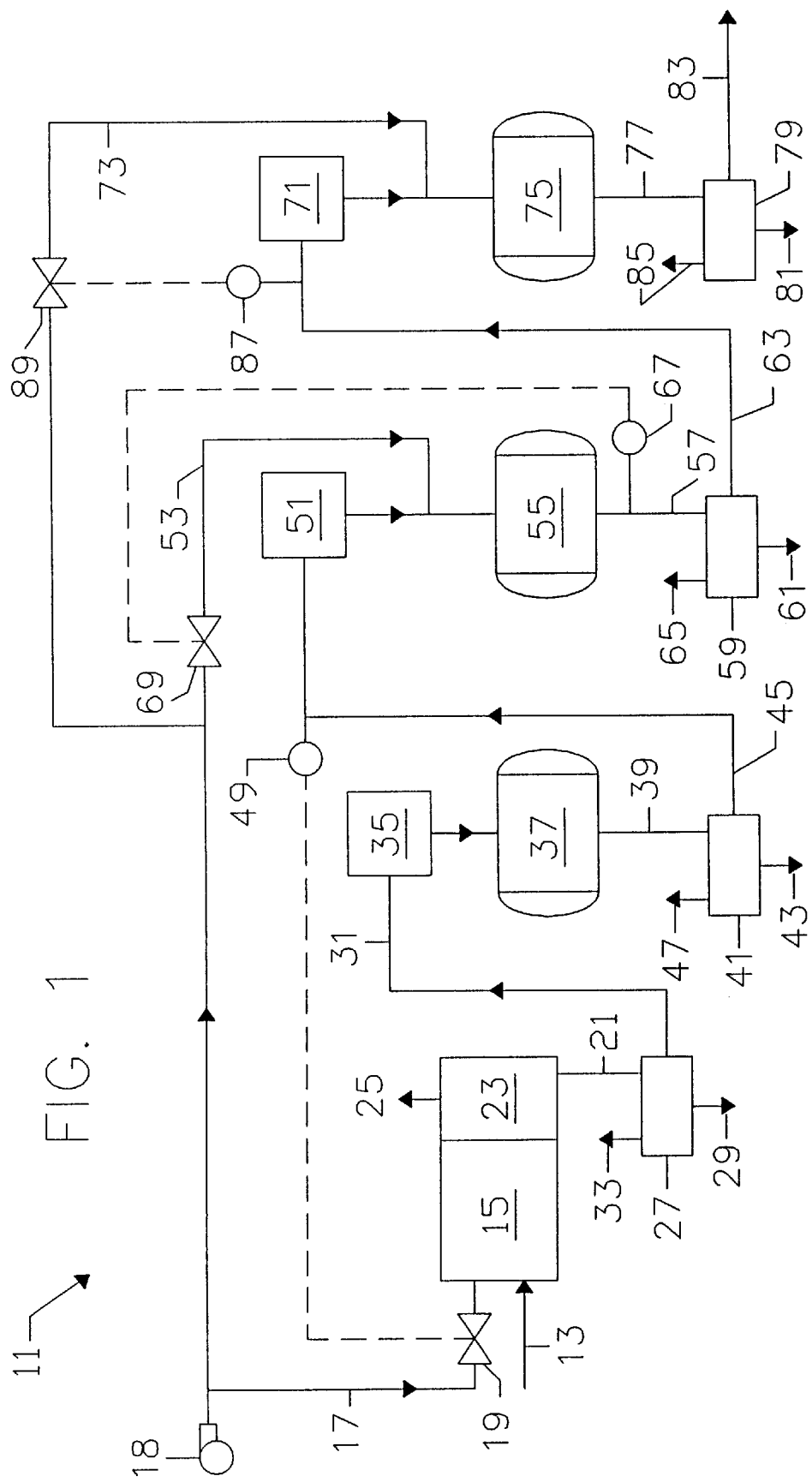
FIG. 1 is a schematic process flow diagram of a sulfur recovery process according to the invention, for treatment of acid gas streams having more than about 30 volume percent hydrogen sulfide.

FIG. 1 shows the preferred embodiment of the sulfur recovery process 11 of the invention for use in a typical application, that of treating an acid gas stream in an oil refinery. These streams are usually combined from several sources, and contain hydrogen sulfide in the range of 35 to 95 volume percent, typically above about 65 volume percent. The acid gas feed stream 13 is combusted in a furnace 15 with an oxidizing gas stream 17, in this case air supplied by a blower 18. As already discussed, in the furnace 15 hydrogen sulfide is oxidized and the following major reactions take place:

$$H_2S + 3/2O_2 \rightarrow H_2O + SO_2 \tag{1}$$

$$2H_2S + SO_2 \rightleftharpoons 3/nS_n + 2H_2O \tag{2}$$

The amount of the oxidizing gas stream 17 added is controlled by a control device 19 such as a damper, control valve, or blower speed control. Enough free oxygen is used to combust any hydrocarbons and other combustible components present, and to combust less than one third of the hydrogen sulfide present, so that the final mole ratio of hydrogen sulfide to sulfur dioxide is at least 3:1, and preferably less than about 6:1. A waste heat boiler 23 cools the gases and generates high pressure steam 25. The resulting waste heat boiler effluent stream 21 contains hydrogen sulfide, sulfur dioxide, water vapor, nitrogen, carbon monoxide, carbon dioxide, carbon disulfide, carbonyl sulfide, and elemental sulfur as major components. The waste heat boiler effluent stream 21 is cooled further in a condenser 27, causing the elemental sulfur to condense out in a liquid sulfur phase 29, leaving a second gas stream 31 and generating low pressure steam 33.

The second gas stream 31 is reheated in a heater 35 and passed to a first catalytic reactor 37 filled with an activated alumina Claus catalyst. The first catalytic reactor 37 is operated at typical Claus process conditions, except for the elevated $H_2S:SO_2$ ratio, and discharges a first reactor effluent stream 39 containing elemental sulfur. The first reactor effluent stream 39 is cooled in a first reactor condenser 41, once again causing the elemental sulfur to condense out in a liquid sulfur phase 43, leaving a first reactor condenser effluent stream 45 and generating low pressure steam 47.

An $H_2S:SO_2$ ratio analyzer/controller 49 monitors the first reactor condenser effluent stream 45 and adjusts the air flow rate to the furnace 15 via the control device 19. A $H_2S:SO_2$ ratio of about 100:1 is preferred for reasons to be discussed below. The $H_2S$ concentration in the first reactor condenser effluent stream 45 is typically about six volume percent under these conditions. As an alternative, the $H_2S$ concentration of the first reactor condenser effluent stream 45 can be used to adjust the air rate to the furnace 15. The severely substoichiometric conditions in the furnace 15 ensure that there is essentially no free oxygen in the second gas stream 31, so that sulfate formation is not a problem in the first catalytic reactor 37.

The first reactor condenser effluent stream 45 is reheated in a heater 51 and combined with a controlled stream of air 53 before being passed to a second catalytic reactor 55 that is filled with a special catalyst. The special catalyst utilizes an active ingredient having at least one oxide of at least two transition metals from period IV of the Periodic Table, that is, the elements from scandium (at. no. 21) to zinc (at. no. 30) inclusive. The oxide can be present as a mix of separate oxides, such as $CuO$, $Cr_2O_3$, etc. or as a single mixed oxide. The preferred form of the latter type is the well known spinel structure, represented by $AB_2O_4$, where A and B each represent at least one metal. Although it appears that the various forms of metal oxide coexist under typical catalyzing conditions, it is preferred that the catalyst be manufactured with the active ingredient being predominantly in the spinel form. A preferred catalyst is made up of at least 20 weight percent $CuCr_2O_4$, the balance being made up by a carrier containing alumina, silica or a combination of both.

The carrier for the catalyst can be any one of the typical ceramic bases, such as activated alumina and silica. While these materials are often the source of sulfate formation problems with conventional Claus catalysts, their use does not inhibit the performance of the active ingredient in the special catalyst. Non-ceramic carriers such as metal screen and foamed metal can also be used. The catalyst should have a specific surface area of at least about 6 $m^2/g$ and porosity of at least about 40 percent. Neither the catalyst per se nor any method of preparing or manufacturing it is claimed in the present application.

As already discussed, the special catalyst's active ingredient operates so that sulfate formation does not deactivate the catalyst. Without claiming any specific mechanism, the following reactions appear to take place in and on the catalyst:

$$2H_2S+3O_2 \rightarrow 2SO_2+2H_2O \tag{8}$$

$$2SO_2+2MeO+O_2 \rightarrow 2MeSO_4 \tag{9}$$

$$7H_2S+2MeSO_4 \rightarrow 9/nS_n+Me_2O+7H_2O \tag{10}$$

$$COS+3/2O_2 \rightarrow CO2+SO_2 \tag{11}$$

$$CS_2+3O_2 \rightarrow CO_2+2SO_2 \tag{12}$$

$$1/nS_n+O_2 \rightarrow SO_2 \tag{13}$$

where Me represents one of the metals in the catalyst active ingredient. Reaction (13) occurs when both excess oxygen and elevated temperatures are present. Conversion of COS and $CS_2$ to elemental sulfur typically results in an additional 0.5 percent or more sulfur recovery as compared to the selective direct oxidation processes of Berben et al., Lagas et al., and van den Brink et al.

The following features should be considered when using the special catalyst. Optimum conversion is obtained at temperatures at or below 300° C., with the potential for sulfur condensation setting the lower temperature limit. For best results, the $H_2S:SO_2$ ratio in the gas should be significantly higher than 2:1. This is why the conventional Claus reactor is operated to give a high effluent $H_2S:SO_2$ ratio. Finally, overheating the catalyst bed inhibits the consumption of $SO_2$ in reaction (9), and $SO_2$ generated in reactions (8) and (11)–(13) will be discharged in the reactor effluent. As some of the reactions involving $H_2S$ are highly exothermic, there is an upper practical limit of about 6 volume percent $H_2S$ for the acid gas contacting the catalyst in order to avoid overheating the catalyst bed.

Reaction in the second catalytic reactor 55 results in a second reactor effluent stream 57 containing elemental sulfur. The second reactor effluent stream 57 is cooled in a condenser 59, once again causing the elemental sulfur to condense out in a liquid sulfur phase 61, leaving a second reactor condenser effluent stream 63 and generating low pressure steam 65.

As already discussed, the oxidation of $H_2S$ to $SO_2$ is highly exothermic, so that the temperature in the second catalytic reactor 55 can rise excessively. To prevent this, the temperature near the outlet of the second catalytic reactor 55 is measured, and a temperature controller 67 controls the air stream 53 flow rate via a control valve 69 to maintain the desired outlet temperature. If a conventional Claus catalyst is used in the second catalytic reactor 55, the air line 53 and the temperature control scheme can be omitted.

The second reactor condenser effluent stream 63 is reheated in a heater 71 and combined with a controlled air stream 73 before being passed to a final catalytic reactor 75 that is filled with the special catalyst. A final reactor effluent stream 77 is discharged from the final catalytic reactor 75 and cooled in a condenser 79, once again causing elemental sulfur to condense out in a liquid sulfur phase 81, leaving a product gas stream 83 and generating low pressure steam 85.

An $H_2S$ analyzer/controller 87 monitors the second reactor condenser effluent stream 63 and adjusts the flow of the controlled air stream 73 via a control valve 89 to keep overall oxidation just below or at the stoichiometric level. Due to the low $H_2S$ concentration in the second reactor condenser effluent stream 63, reactor temperature control is not required.

The product gas stream 83 contains $H_2S$ and $SO_2$ in a ratio of 2:1, usually at lower levels than in the product gas of the conventional Claus process, and only trace amounts of COS and $CS_2$. Total sulfur content of the product gas stream 83 is lower than in the product gas of the conventional Claus process, due to the greater overall sulfur recovery of the present invention.

Figure 2:
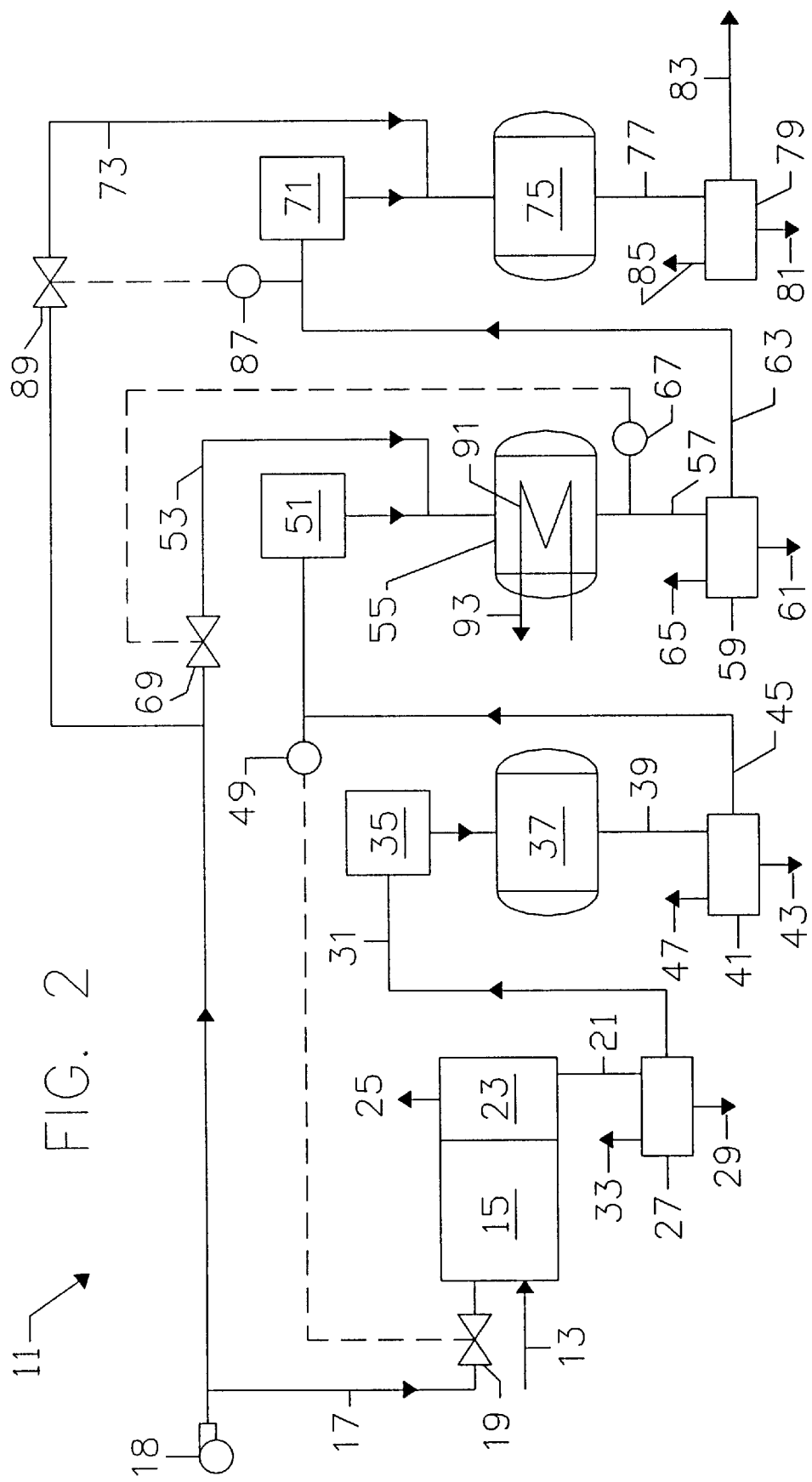
FIG. 2 is a schematic process flow diagram of an alternative embodiment of the invention, for treatment of acid gas streams having between about 65 and about 35 volume percent hydrogen sulfide.

FIG. 2 shows an alternative embodiment for use with feed gas streams where the hydrogen sulfide concentration ranges from about 35 to about 65 volume percent, as is typical in natural gas plants. The same reference numbers will be used for elements corresponding to elements in FIG. 1.

Due to the lower $H_2S$ concentration in the feed gas 13, reaction is reduced in the first catalytic reactor 37 and the concentration of $H_2S$ in the first reactor condenser effluent stream 45 can exceed 3 volume percent. This causes more reaction to occur in the second catalytic reactor 55, tending to increase the reactor's temperature above the desired 300° C. value. This extra heat generation is countered by the use of cooling coils 91 in the second catalytic reactor 55, fed with cooling water 93. With this extra cooling capacity, the temperature controller 67 can operate as in FIG. 1 to maintain temperature in the second catalytic reactor 55.

Figure 3:
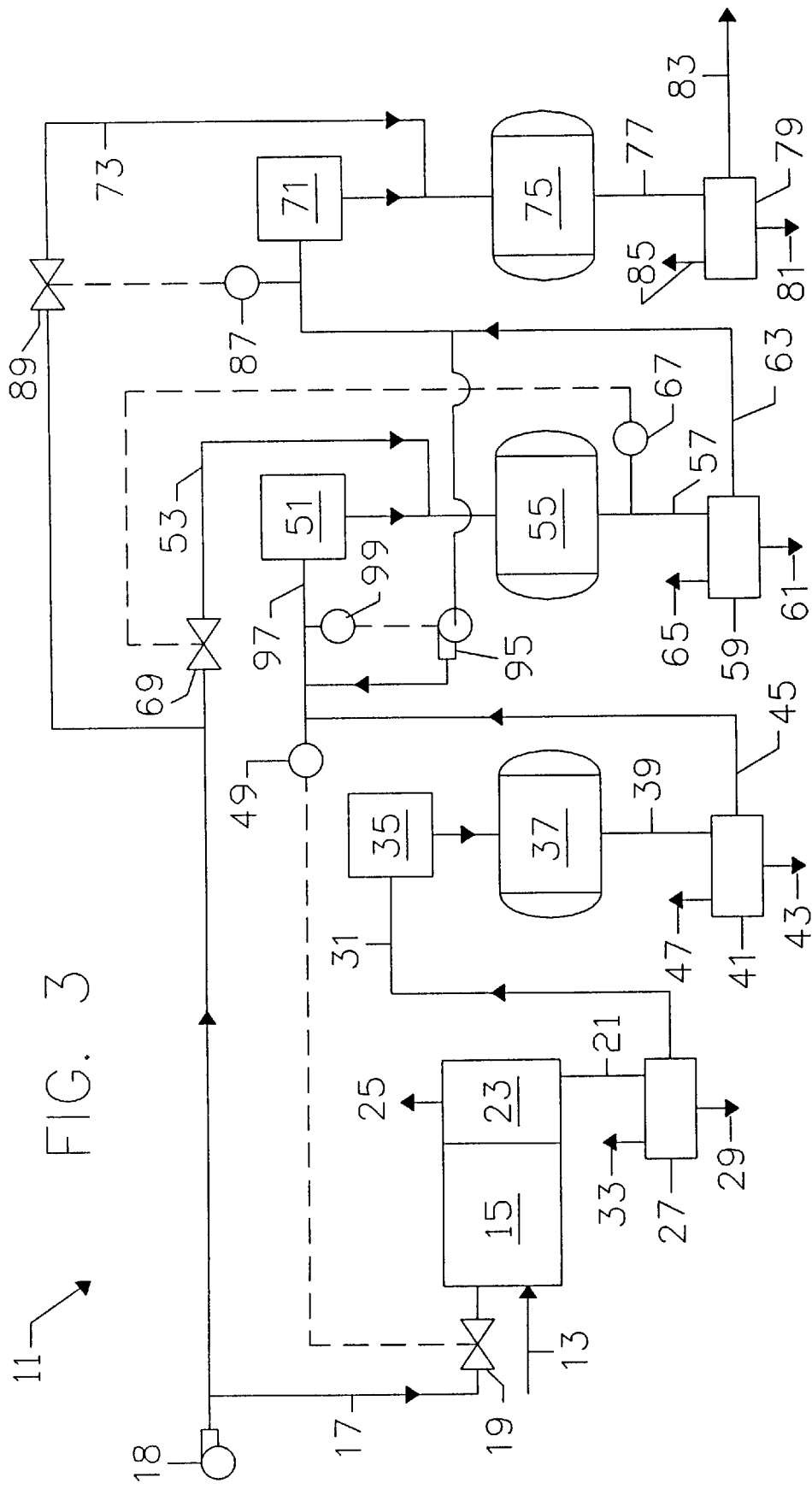
FIG. 3 is a schematic process flow diagram of yet another embodiment of the invention, also for treatment of acid gas streams having between about 65 and about 35 volume percent hydrogen sulfide.

An alternative to the use of cooling coils is shown in FIG. 3, where the same reference numbers are used for the corresponding elements in FIG. 1. In this embodiment, part of the second reactor condenser effluent stream 63 is recycled back to the first reactor condenser effluent stream 45 using a blower 95. This results in a diluted gas stream 97 having a lower $H_2S$ concentration than the first reactor condenser effluent stream 45. An $H_2S$ analyzer/controller 99 monitors the diluted gas stream 97 and adjusts the blower 95 flow rate to hold the $H_2S$ concentration in the diluted gas stream 97 at about 3 volume percent. With this arrangement, the temperature controller 67 can operate as in FIG. 1 to maintain temperature in the second catalytic reactor 55.

In the preceding discussion, it has been assumed that a total of three catalytic reactors is required to meet local regulations and economic factors. For cases where these requirements are less stringent, a two reactor scheme can be used. In such a case, the second catalytic reactor 55 and its associated equipment are omitted, and the process flow proceeds directly from the first reactor condenser 41 to the final reactor heater 71. This scheme has obvious economic benefits.

Figure 4:
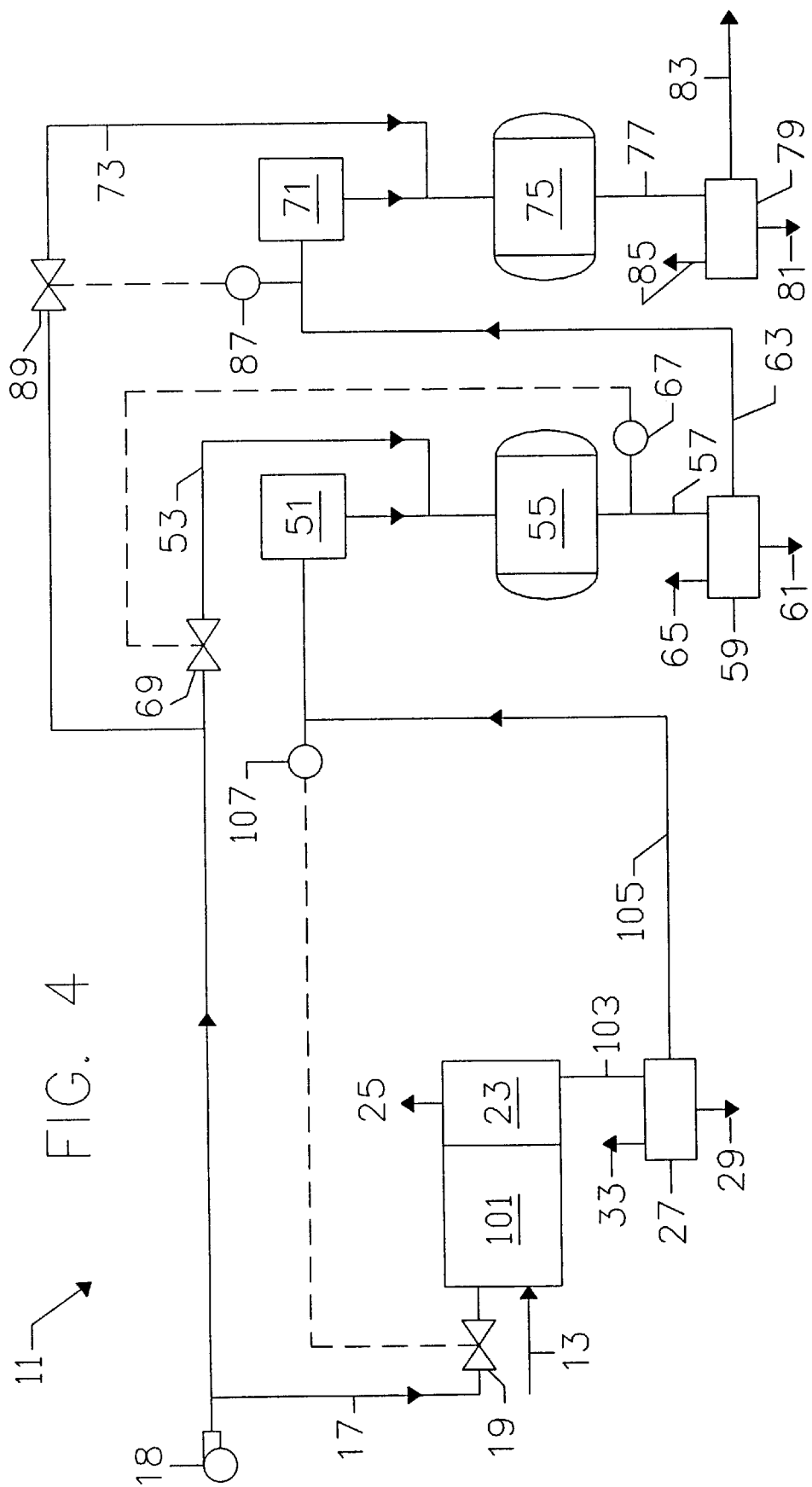
FIG. 4 is a schematic process flow diagram of a forth embodiment of the invention, utilizing an acid gas bypass scheme.

FIG. 4 illustrates yet another embodiment, for use with acid gas feed streams containing less than about 35 volume percent hydrogen sulfide. These feeds usually cannot be reliably oxidized by combustion, so the furnace 15 is replaced with an oxidizing thermocatalytic reactor 101 filled with special catalyst. The first reactor 37 is omitted along with its associated equipment. The remaining apparatus is the same as in the previous embodiments, and the same reference numbers are used for elements corresponding to elements in FIG. 1.

The feed gas stream 13 is combined in the thermocatalytic reactor 15 with an oxidizing gas stream 17, in this case air supplied by a blower 18. The amount of the oxidizing gas stream 17 added is controlled by a control device 19. Less than one third of the hydrogen sulfide present is oxidized, so that the mole ratio of hydrogen sulfide to sulfur dioxide in the thermocatalytic reactor effluent stream 103 is at least 3:1, and preferably less than about 6:1. The reactor effluent stream 103 contains the same major components as the waste heat boiler effluent stream 21 of FIG. 1, although in different amounts. A waste heat boiler 23 cools the reactor effluent stream 103 and generates high pressure steam 25.

The reactor effluent stream 103 is cooled further in a condenser 27, causing the elemental sulfur to condense out in a liquid sulfur phase 29, leaving a thermocatalytic reactor condenser effluent stream 105 and generating low pressure steam 33. An $H_2S:SO_2$ ratio analyzer/controller 107 monitors the thermocatalytic reactor condenser effluent stream 105 and adjusts the control device 19 to maintain the $H_2S:SO_2$ ratio in the stream around at least 3:1. The process proceeds from this point just as it does in the previous embodiments following the first reactor condenser 41.

Figure 5:
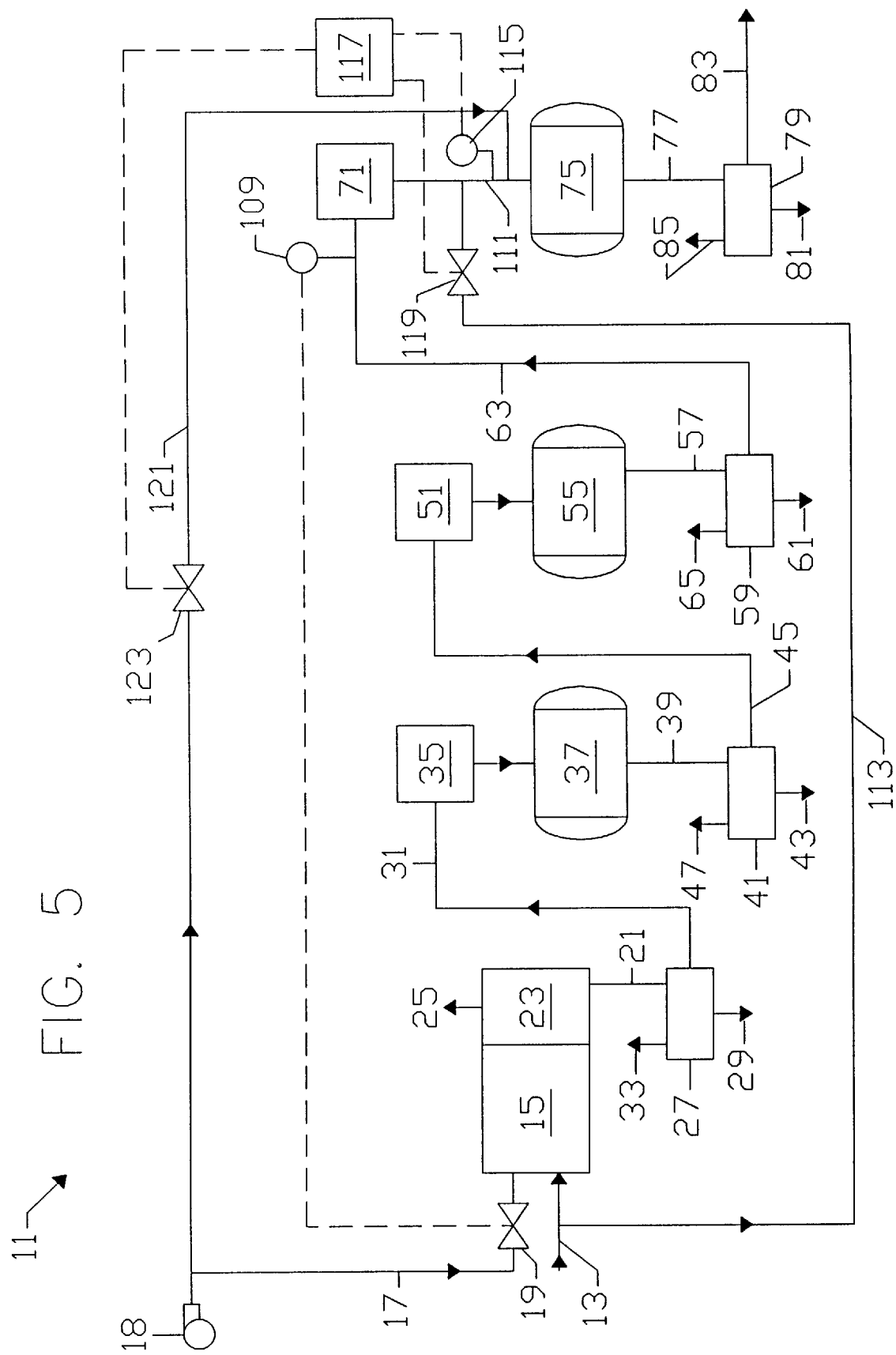
FIG. 5 is a schematic process flow diagram of an alternate embodiment of the invention, for treatment of acid gas streams having less than about 35 volume percent hydrogen sulfide.

FIG. 5 illustrates an alternative embodiment of the generic process 11 of FIG. 1, where the same reference numbers are used for elements corresponding to elements in FIG. 1. This embodiment can be used in conjunction with the refinements of FIGS. 2 through 4 as well. In this embodiment, the furnace 15, the first reactor 37, and the second reactor 55 and their associated equipment are set up as a conventional Claus process. An analyzer/controller 109 monitors the $H_2S:SO_2$ ratio of the second reactor condenser effluent stream 63 and adjusts the rate of the oxidizing gas stream 17 via the control device 19 to hold the ratio at about 2:1.

Some of the feed gas 13 is bypassed around the furnace 15 and combined with the second reactor condenser effluent stream 63 downstream of the heater 71 to form an $H_2S$ enriched stream 111. A final reactor controller 117 monitors the enriched $H_2S$ stream 111 via an $H_2S$ analyzer 115, and adjusts both the flow rate of the acid gas bypass stream 113 via a control valve 119 and the flow rate of a controlled air stream 121 via a control valve 123. The acid gas bypass stream 113 is adjusted to ensure that the gas going into the final catalytic reactor 75 has an $H_2S$ concentration of around 3 volume percent. As an alternative, a ratio analyzer can be used in place of the $H_2S$ analyzer 115, in order to keep the $H_2S:SO_2$ ratio of the enriched $H_2S$ stream 111 at or above 3:1.

As an option, an analyzer (not shown), such as an on-line gas chromatograph, can be installed on the enriched $H_2S$ stream 111 to measure the levels of COS, $CS_2$ and unconverted hydrocarbons. This measurement is used by the final reactor controller 115 to adjust the flow rate of the controlled air stream 121 via the control valve 123.

The sulfur recovery process of the invention has several advantages over the prior art. The process converts and recovers more of the sulfur present in the feed gas stream than the Claus process. It converts COS and $CS_2$ as well as $H_2S$ and $SO_2$ sulfur compounds. It uses substantially the same equipment as the conventional Claus process, without the need for added tail gas processing to achieve its conversion efficiency, and can be built for about the same cost.

The invention has been shown in several embodiments. It should be apparent to those skilled in the art that the invention is not so limited, but is susceptible to various changes and modifications without departing from the spirit of the invention.

What is claimed is:

1. A process for recovery of sulfur from an acid gas feed stream containing at least about thirty-five volume percent hydrogen sulfide, comprising the steps of:
    A) oxidizing the feed gas stream with an oxygen-containing gas stream in a furnace, forming a furnace effluent stream containing elemental sulfur and having a hydrogen sulfide to sulfur dioxide mole ratio of at least three to one and less than about six to one;
    B) separating and removing the elemental sulfur from the furnace effluent stream, leaving a second gas stream;
    C) contacting the second gas stream with a Claus catalyst in a Claus reactor under catalyzing conditions, thereby forming a first reactor effluent stream containing elemental sulfur;

D) separating and removing the elemental sulfur from the first reactor effluent stream;

E) combining and reacting the remaining gas of the first reactor effluent stream below about 300° Celsius and without sulfur condensation with an oxygen-containing gas stream in the presence of a special catalyst comprising at least twenty percent by weight of $CuCr_2O_4$ as an active ingredient on a carrier, thereby forming a final reactor effluent stream containing elemental sulfur; and F) separating and removing the elemental sulfur from the final reactor effluent stream.

2. The process recited in claim 1, further comprising the step of measuring the ratio of hydrogen sulfide to sulfur dioxide in the remaining gas of the first reactor effluent stream and controlling the flow rate of the oxygen-containing gas stream in step (A) to maintain a hydrogen sulfide to sulfur dioxide ratio of about 100:1.

3. The process recited in claim 1, further comprising the step of measuring the $H_2S$ concentration in the remaining gas of the first reactor effluent stream and controlling the flow rate of the oxygen-containing gas stream in step (E) to maintain overall oxidation just below or at the stoichiometric level for the production of elemental sulfur.

4. The process recited in claim 1, further comprising the steps of taking an acid gas bypass stream from the acid gas feed stream, combining the acid gas bypass stream with the remaining gas of the first reactor effluent stream to form a hydrogen sulfide enriched stream, measuring the $H_2S$ concentration or the $H_2S:SO_2$ mole ratio in the hydrogen sulfide enriched stream, and controlling the flow rate of the acid gas bypass stream to maintain a hydrogen sulfide concentration of about three percent by volume in the hydrogen sulfide enriched stream.

5. The process recited in claim 4, further comprising the step of controlling the flow rate of the oxygen-containing gas stream of step (E) in claim 1 to maintain overall oxidation just below or at the stoichiometric level for the production of elemental sulfur.

6. The process recited in claim 1, further comprising the steps, occurring between steps (D) and (E), of contacting the remaining gas of the first reactor effluent stream with either the Claus catalyst or the special catalyst in a second catalytic reactor under catalyzing conditions, thereby forming a second reactor effluent stream containing elemental sulfur, separating and removing the elemental sulfur from the second reactor effluent stream, and passing the remaining gas of the second reactor effluent stream on to step (E) in place of the remaining gas of the first reactor effluent stream.

7. The process recited in claim 6, further comprising the step of measuring the $H_2S$ concentration in the remaining gas of the second reactor effluent stream and controlling the flow rate of the oxygen-containing gas stream in step (E) of claim 1 to maintain overall oxidation just below or at the stoichiometric level for the production of elemental sulfur.

8. The process recited in claim 6, wherein the catalyst in the second catalytic reactor is the Claus catalyst.

9. The process recited in claim 8, further comprising the steps of taking an acid gas bypass stream from the acid gas feed stream, combining the acid gas bypass stream with the remaining gas of the second reactor effluent stream to form a hydrogen sulfide enriched stream, measuring the $H_2S$ concentration or the $H_2S:SO_2$ mole ratio in the hydrogen sulfide enriched stream, and controlling the flow rate of the acid gas bypass stream to maintain a hydrogen sulfide concentration of about three percent by volume in the hydrogen sulfide enriched stream.

10. The process recited in claim 9, further comprising the step of controlling the flow rate of the oxygen-containing gas stream of step (E) in claim 1 to maintain overall oxidation just below or at the stoichiometric level for the production of elemental sulfur.

11. The process recited in claim 6, wherein the catalyst in the second catalytic reactor is the special catalyst.

12. The process recited in claim 11, wherein the remaining gas of the first reactor effluent stream is combined and reacted with a controlled oxygen-containing gas stream in the second catalytic reactor, and further comprising the step of measuring the temperature in the second catalytic reactor and controlling the flow rate of the controlled oxygen-containing gas stream to maintain a preselected second reactor outlet temperature below about 300° Celsius and without sulfur condensation.

13. The process recited in claim 12, further comprising the step of cooling the catalyst in the second catalytic reactor.

14. The process recited in claim 11, further comprising the step of taking a recycle stream from the remaining gas of the second reactor effluent stream, recycling the recycle stream, and combining the recycle stream with the remaining gas of the first reactor effluent stream to form a diluted gas stream.

15. The process recited in claim 14, further comprising the step of measuring the $H_2S$ concentration in the diluted gas stream and controlling the flow rate of the recycle stream to maintain a hydrogen sulfide concentration of about three volume percent in the diluted gas stream.

16. The process recited in claim 1, wherein the special catalyst of step (E) also promotes the conversion of $CS_2$ and COS to elemental sulfur in accordance with the following overall reactions:

$$CS_2 + 3O_2 \rightarrow CO_2 + 2SO_2$$

$$COS + 3/2O_2 \rightarrow CO2 + SO_2.$$

17. A process for treating an acid gas feed stream containing less than about thirty-five volume percent hydrogen sulfide, comprising the steps of:

A) oxidizing the feed gas stream with an oxygen-containing gas stream in the presence of a special catalyst comprising at least twenty percent by weight of $CuCr_2O_4$ as an active ingredient on a carrier in a thermocatalytic reactor under catalyzing conditions, thereby forming a thermocatalytic reactor effluent gas stream containing elemental sulfur;

B) separating and removing the elemental sulfur from the thermocatalytic reactor effluent stream, leaving a second gas stream;

C) combining and reacting the second gas stream with an additional oxygen-containing gas stream in the presence of the special catalyst under catalyzing conditions, thereby forming a first reactor effluent stream containing elemental sulfur;

D) separating and removing the elemental sulfur from the first reactor effluent stream;

E) combining and reacting the remaining gas of the first reactor effluent stream with an additional oxygen-containing gas stream in the presence of the special catalyst under catalyzing conditions, thereby forming a final reactor effluent stream containing elemental sulfur, the overall addition of oxygen being less than or equal to the stoichiometric amount required for production of elemental sulfur; and F) separating and removing the elemental sulfur from the final reactor effluent stream.

18. The process recited in claim 17, wherein the mole ratio of hydrogen sulfide to sulfur dioxide in the first reactor effluent stream is at least 100:1.

19. The process recited in claim 17, further comprising the step of measuring the hydrogen sulfide to sulfur dioxide mole ratio in the remaining gas of the thermocatalytic reactor effluent stream and controlling the flow rate of the oxygen-containing gas stream in step (A) to maintain the hydrogen sulfide to sulfur dioxide ratio in the thermocatalytic reactor effluent stream at a value of at least about 3:1.

20. The process recited in claim 17, further comprising the step of measuring the temperature in a first reactor and controlling the flow rate of the oxygen-containing gas stream in step (C) to maintain a preselected first reactor outlet temperature below about 300° Celsius and without sulfur condensation.

21. The process recited in claim 17, further comprising the step of measuring the $H_2S$ concentration in the remaining gas of the first reactor effluent stream and controlling the flow rate of the oxygen-containing gas stream in step (E) to maintain overall oxidation just below or at the stoichiometric level.

22. The process recited in claim 17, further comprising the steps of taking an acid gas bypass stream from the acid gas feed stream, combining the acid gas bypass stream with the remaining gas of the first reactor effluent stream to form a hydrogen sulfide enriched stream, measuring the $H_2S$ concentration or the $H_2S:SO_2$ mole ratio in the hydrogen sulfide enriched stream, and controlling the flow rate of the acid gas bypass stream to maintain a hydrogen sulfide concentration of about three percent by volume in the hydrogen sulfide enriched stream.

23. The process recited in claim 22, further comprising the step of controlling the flow rate of the oxygen-containing gas stream of step (E) in claim 20 to maintain overall oxidation just below or at the stoichiometric level.

24. The process recited in claim 17, wherein the special catalyst of step (E) also promotes the conversion of $CS_2$ and COS to elemental sulfur in accordance with the following overall reactions:

$$CS_2 + 3O_2 \rightarrow CO_2 + 2SO_2$$

$$COS + 3/2O_2 \rightarrow CO2 + SO_2.$$

* * * * *